(12) United States Patent
Tsuchiya et al.

(10) Patent No.: US 11,100,345 B2
(45) Date of Patent: Aug. 24, 2021

(54) VEHICLE CONTROL SYSTEM, VEHICLE CONTROL METHOD, AND READABLE STORAGE MEDIUM

(71) Applicant: HONDA MOTOR CO., LTD., Tokyo (JP)

(72) Inventors: Masamitsu Tsuchiya, Wako (JP); Hideki Matsunaga, Wako (JP); Yasuharu Hashimoto, Wako (JP); Etsuo Watanabe, Wako (JP); Yuki Oshitani, Tokyo (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 16/262,973

(22) Filed: Jan. 31, 2019

(65) Prior Publication Data
US 2019/0244039 A1 Aug. 8, 2019

(30) Foreign Application Priority Data
Feb. 8, 2018 (JP) .............................. JP2018-021425

(51) Int. Cl.
*G06K 9/00* (2006.01)
*G08G 1/16* (2006.01)
*G06K 9/32* (2006.01)

(52) U.S. Cl.
CPC ....... *G06K 9/00805* (2013.01); *G06K 9/3241* (2013.01); *G08G 1/166* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 10,089,872 B1* | 10/2018 | Beaurepaire | ............. | G08G 1/20 |
| 10,407,061 B2* | 9/2019 | Ohmura | ............. | G06K 9/00805 |
| 10,620,633 B2* | 4/2020 | Yamamoto | ........... | B62D 15/025 |
| 2015/0161894 A1* | 6/2015 | Duncan | ............. | G06K 9/00845 |
| | | | | 701/1 |
| 2015/0375784 A1* | 12/2015 | Ogawa | ................... | G08G 1/167 |
| | | | | 701/41 |
| 2017/0080952 A1* | 3/2017 | Gupta | ................... | B60W 50/14 |
| 2017/0345309 A1* | 11/2017 | Bostick | ................ | B60W 30/16 |
| 2018/0056997 A1* | 3/2018 | Ohmura | ................ | B60W 30/09 |

FOREIGN PATENT DOCUMENTS

JP 11-034898 2/1999

* cited by examiner

*Primary Examiner* — Vikkram Bali
(74) *Attorney, Agent, or Firm* — Amin, Turocy & Watson, LLP

(57) ABSTRACT

A vehicle control system includes: a recognizer that is configured to recognize a surroundings status of a vehicle; and a driving controller that is configured to control at least steering of the vehicle on the basis of the surroundings status recognized by the recognizer, wherein the driving controller is configured to cause the vehicle to run on the basis of a first reference line deviating to one side of a road in a case in which a target obstacle is not recognized in an advancement direction of the vehicle by the recognizer and, is configured to cause the vehicle to avoid the target obstacle after causing the vehicle to run on the basis of a second reference line disposed on an other side of the road from the first reference line, in a case in which the target obstacle is recognized by the recognizer.

14 Claims, 11 Drawing Sheets

VEHICLE CONTROL SYSTEM, VEHICLE CONTROL METHOD, AND READABLE STORAGE MEDIUM

CROSS-REFERENCE TO RELATED APPLICATION

Priority is claimed on Japanese Patent Application No. 2018-021425, filed Feb. 8, 2018, the content of which is incorporated herein by reference.

BACKGROUND

Field of the Invention

The present invention relates to a vehicle control system, a vehicle control method, and a readable storage medium.

Description of Related Art

In recent years, automatic control of vehicles has been researched. In relation to this, a vehicle running control device has been disclosed which performs control of a target position to match general driving characteristics by displacing the target position on a linear road immediately before a turning road in a direction opposite to a turning direction (Japanese Unexamined Patent Application, First Publication No. H11-034898).

However, in conventional technology, control of a vehicle on a specific road on which an obstacle is present has not been disclosed.

An aspect of the present invention is realized in consideration of such situations, and one object thereof is to provide a vehicle control system, a vehicle control method, and a recording medium capable of appropriately performing control of a vehicle in accordance with traffic conditions.

SUMMARY

A vehicle control system, a vehicle control method, and a readable storage medium according to the present invention employ the following configurations.

(1): A vehicle control system according to one aspect of the present invention is a vehicle control system including: a recognizer that is configured to recognize a surroundings status of a vehicle; and a driving controller that is configured to control at least steering of the vehicle on the basis of the surroundings status recognized by the recognizer, wherein the driving controller is configured to cause the vehicle to run on the basis of a first reference line deviating to one side of a road in a case in which a target obstacle is not recognized in an advancement direction of the vehicle by the recognizer and, is configured to cause the vehicle to avoid the target obstacle after causing the vehicle to run on the basis of a second reference line disposed on an other side of the road from the first reference line, in a case in which a target obstacle is recognized by the recognizer.

(2): In the aspect (1) described above, the target obstacle is an object that inhibits running of the vehicle in a case in which the vehicle runs on the basis of the first reference line.

(3): In the aspect (1) or (2) described above, in a case in which at least one or more oncoming vehicles present near the target obstacle are recognized by the recognizer after causing the vehicle to run on the basis of the second reference line, the driving controller is configured to cause the vehicle to run such that distances between the vehicle and the oncoming vehicles in a horizontal direction are further away from the oncoming vehicles than in a case in which the vehicle runs on the basis of the second reference line.

(4): In the aspect (3) described above, in a case in which the oncoming vehicles are recognized after causing the vehicle to run on the basis of the second reference line, the driving controller is configured to cause the vehicle to run on the basis of the first reference line.

(5): In the aspect (3) or (4) described above, in a case in which the oncoming vehicles are recognized after causing the vehicle to run on the basis of the second reference line, the driving controller is configured to cause the vehicle to run such that the distance in the horizontal direction becomes further away from the oncoming vehicles and that they slowly run or stop in front of the target obstacle.

(6): In any one of the aspects (3) to (5) described above, in a case in which the oncoming vehicles are recognized after causing the vehicle to run on the basis of the second reference line, and the oncoming vehicles satisfy a predetermined condition, the driving controller is configured to cause the vehicle to avoid the target obstacle by causing the vehicle to run on the basis of the second reference line.

(7): In the aspect (6) described above, in a case in which the oncoming vehicles do not satisfy the predetermined condition, the driving controller is configured to cause the vehicle to run such that the distances in the horizontal direction become further away from the oncoming vehicles without causing the vehicle to run on the basis of the second reference line.

(8): In the aspect (6) or (7) described above, the predetermined condition is a condition that an oncoming vehicle present on a side in a direction of further advancement than the target obstacle shows an intention indicating that a priority level of the vehicle relating to running on the road is high.

(9): In any one of the aspects (6) to (8) described above, the predetermined condition is a condition that the oncoming vehicle present on a side in a direction of further advancement than the target obstacle stops or a condition that the oncoming vehicle present on a side in a direction of further advancement than the target obstacle decelerates by a predetermined degree or more before a predetermined distance from the target obstacle.

(10): In any one of the aspects (3) to (9) described above, in a case in which the oncoming vehicle in a stop state is recognized after causing the vehicle to run on the basis of the second reference line, the driving controller determines whether to cause the vehicle to run on the basis of the second reference line or to cause the vehicle to run such that the distance between the vehicle and the oncoming vehicle in the horizontal direction is further away than the second reference line in accordance with the distance from the vehicle to the target obstacle.

(11): In the aspect (10) described above, in a case in which a distance to the target obstacle is equal to or longer than a set distance, the driving controller is configured to cause the vehicle to run such that the distance between the vehicle and the oncoming vehicle in the horizontal direction is further away than the second reference line.

(12): In the aspect (10) or (11) described above, in a case in which a distance to the target obstacle is shorter than the set distance, the driving controller is configured to cause the vehicle to run based on the second reference line.

(13): In any one of the aspects (1) to (12) described above, the second reference line is defined between the first reference line and a running line of a case in which the vehicle runs without coming into contact with the target obstacle.

(14): A vehicle control method according to one aspect of the present invention is a vehicle control method using a computer, the vehicle control method including: recognizing a surroundings status of a vehicle; controlling at least steering of the vehicle on the basis of the recognized surroundings status; causing the vehicle to run on the basis of a first reference line deviating to one side of a road in a case in which a target obstacle is not recognized in an advancement direction of the vehicle; and causing the vehicle to avoid the target obstacle after causing the vehicle to run on the basis of a second reference line disposed on an other side of the road from the first reference line in a case in which a target obstacle is recognized.

(15): There is provided a non-transitory computer-readable storage medium causing a computer to execute: recognizing a surroundings status of a vehicle; controlling at least steering of the vehicle on the basis of the recognized surroundings status; causing the vehicle to run on the basis of a first reference line deviating to one side of a road in a case in which a target obstacle is not recognized in an advancement direction of the vehicle; and causing the vehicle to avoid the target obstacle after causing the vehicle to run on the basis of a second reference line disposed on an other side of the road from the first reference line in a case in which the target obstacle is recognized.

According to the aspects (1), (2), and (13) to (15) described above, the vehicle can be appropriately controlled in accordance with traffic conditions. For example, the detection range of sensors of the vehicle can be broadened. For example, an intention of advancement of the vehicle can be notified to an oncoming vehicle.

According to the aspects (3) and (4) described above, the oncoming vehicle can be caused to run more smoothly.

According to the aspect (5) described above, furthermore, the obstacle can be avoided without disturbing passage of the oncoming vehicle.

According to the aspects (6) to (9) described above, the vehicle can be inhibited from unnecessarily moving to the left or right side, and accordingly, the comfort of the vehicle occupant can be improved.

According to the aspects (10) to (12) described above, the vehicle is controlled in accordance with a distance to the obstacle, and accordingly, an influence on traffic participants can be inhibited.

DETAILED DESCRIPTION

Hereinafter, a vehicle control device, a vehicle control method, and a readable storage medium according to embodiments of the present invention will be described with reference to the drawings. Hereinafter, although a case in which a rule of left traffic is applied will be described, the left side and the right side may be interchanged in a case in which a rule of right traffic is applied.

[Entire Configuration]

Figure 1:
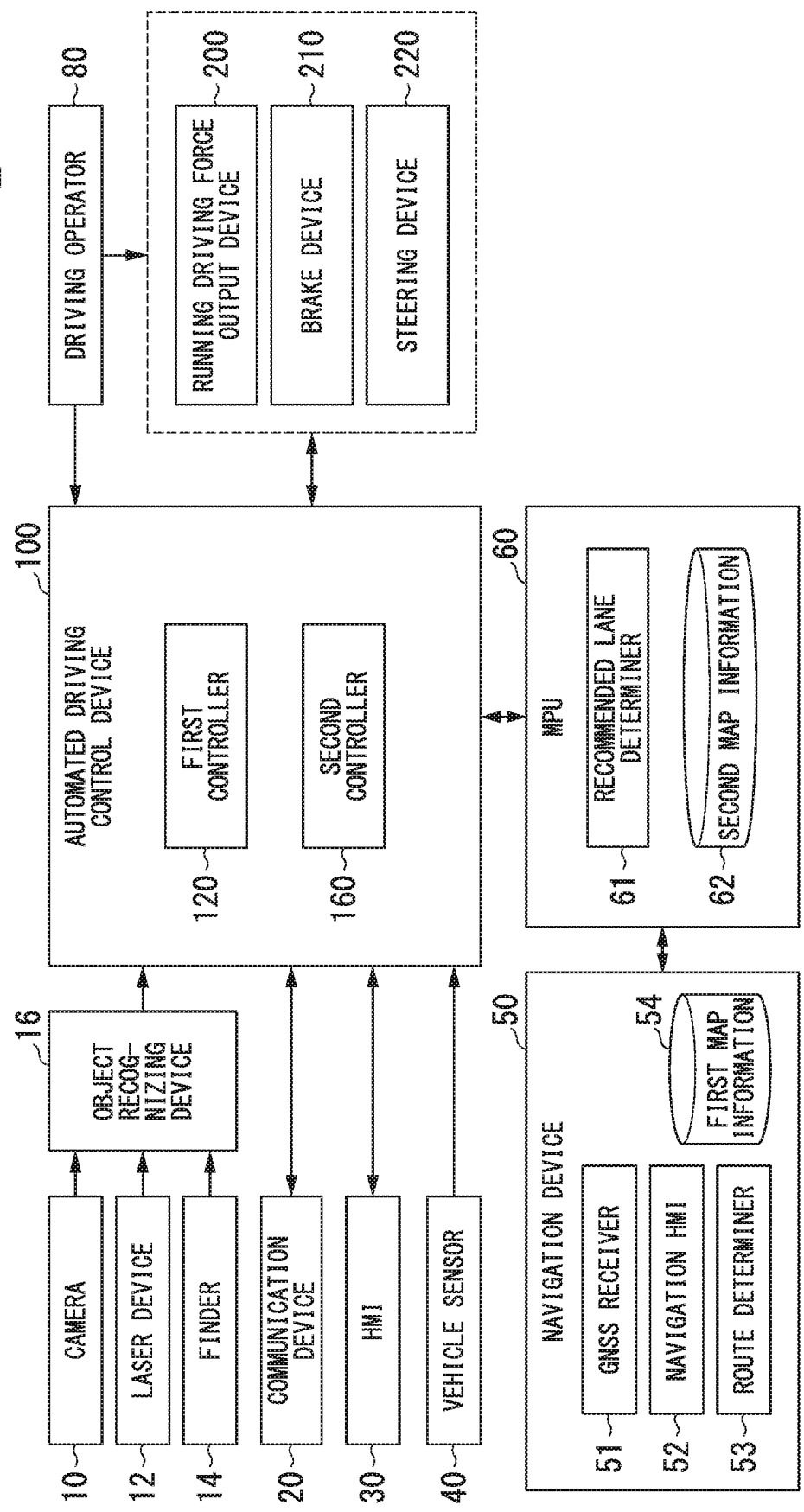
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or discharge power of a secondary cell or a fuel cell.

The vehicle system 1, for example, includes a camera 10, a radar device 12, a finder 14, an object recognizing device 16, a communication device 20, a human machine interface (HMI) 30, a vehicle sensor 40, a navigation device 50, a map positioning unit (MPU) 60, a driving operator 80, an automated driving control device 100, a running driving force output device 200, a brake device 210, and a steering device 220. Such devices and units are interconnected using a multiplex communication line such as a controller area network (CAN) communication line, a serial communication line, a radio communication network, or the like. The configuration shown in FIG. 1 is merely one example, and thus, a part of the configuration may be omitted, and, furthermore, other components may be added thereto.

The camera 10, for example, is a digital camera using a solid-state imaging device such as a charge coupled device (CCD) or a complementary metal oxide semiconductor (CMOS). The camera 10 is installed at arbitrary places on a vehicle (hereinafter, referred to as a subject vehicle M) in which the vehicle system 1 is mounted. In a case in which the side in front is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position of (a distance and an azimuth to) an object by detecting radiowaves (reflected waves) reflected by the object. The radar device 12 is installed at arbitrary places on the subject vehicle M. The radar device 12 may detect a position and a speed of an object using a frequency modulated continuous wave (FM-CW) system.

The finder 14 is a light detection and ranging (LIDAR). The finder 14 emits light to the vicinity of the subject vehicle M and measures scattering light generated in accordance with the emitted light. The finder 14 detects a distance to a target on the basis of a time from light emission to light reception. The emitted light, for example, is a pulse-form laser light. The finder 14 is mounted at an arbitrary position on the subject vehicle M.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the automated driving control device 100. The object recognizing device 16 may output results of detection using the camera 10, the radar device 12, and the finder 14 to the automated driving control device 100 as they are. The object recognizing device 16 may be omitted from the vehicle system 1.

The communication device 20, for example, communicates with other vehicles in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 may include various display devices, a speaker, a buzzer, a touch panel, switches, keys, and the like.

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like.

The navigation device 50, for example, includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of a subject vehicle M on the basis of signals received from GNSS satellites. The position of the subject vehicle M may be identified or supplemented by an inertial navigation system (INS) using an output of the vehicle sensor 40.

The navigation HMI 52 includes a display device, a speaker, a touch panel, a key, and the like. A part or all of the navigation HMI 52 and the HMI 30 described above may be configured to be shared. The route determiner 53, for example, determines a route from a position of the subject vehicle M identified by the GNSS receiver 51 (or an input arbitrary position) to a destination input by a vehicle occupant using the navigation HMI 52 (hereinafter referred to as a route on a map) by referring to the first map information 54. The first map information 54, for example, is information in which a road form is represented by respective links representing a road and respective nodes connected using the links. The first map information 54 may include a curvature of each road, point of interest (POI) information, and the like. The route on the map is output to the MPU 60. The navigation device 50 may perform route guidance using the navigation HMI 52 on the basis of the route on the map. Furthermore, the navigation device 50, for example, may be implemented by a function of a terminal device such as a smartphone or a tablet terminal held by a vehicle occupant. The navigation device 50 may transmit a current location and a destination to a navigation server through the communication device 20 and acquire a route that is equivalent to the route on the map from the navigation server.

The MPU 60, for example, includes a recommended lane determiner 61 and stores second map information 62 in a storage device such as an HDD or a flash memory.

The recommended lane determiner 61 divides a route on the map provided from the navigation device 50 into a plurality of blocks (for example, divides the route for every 100 [m] in the advancement direction of the vehicle) and determines a recommended lane for each block by referring to the second map information 62. The recommended lane determiner 61 determines on which of lanes numbered from the left side to run. In a case in which a branching place is present in the route on the map, the recommended lane determiner 61 determines a recommended lane such that the subject vehicle M can run on a reasonable route for advancement to a branching destination.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone number information, and the like may be included. As the communication device 20 communicates with another device, the second map information 62 may be updated as needed.

The driving operator 80, for example, includes an acceleration pedal, a brake pedal, a shift lever, a steering wheel, a steering wheel variant, a joystick, and other operators. A sensor detecting the amount of an operation or the presence/absence of an operation is installed in the driving operator 80, and a result of the detection is output to the automated driving control device 100 or some or all of the running driving force output device 200, the brake device 210, and the steering device 220.

The automated driving control device 100, for example, includes a first controller 120, and a second controller 160. Each of the first controller 120 and second controller 160, for example, is implemented by a hardware processor such as a central processing unit (CPU) executing a program (software). In addition, some or all of such constituent elements may be implemented by hardware (a circuit; including circuitry) such as a large scale integration (LSI), an application specific integrated circuit (ASIC), a field-programmable gate array (FPGA), or a graphics processing unit (GPU) or may be implemented by cooperation between software and hardware. The program may be stored in a storage device such as an HDD or a flash memory of the automated driving control device 100 in advance or may be stored in a readable storage medium (non-transitory storage medium) such as a DVD or a CD-ROM that can be loaded or unloaded and installed in the HDD or the flash memory of the automated driving control device 100 by loading the storage medium into a drive device.

Figure 2:
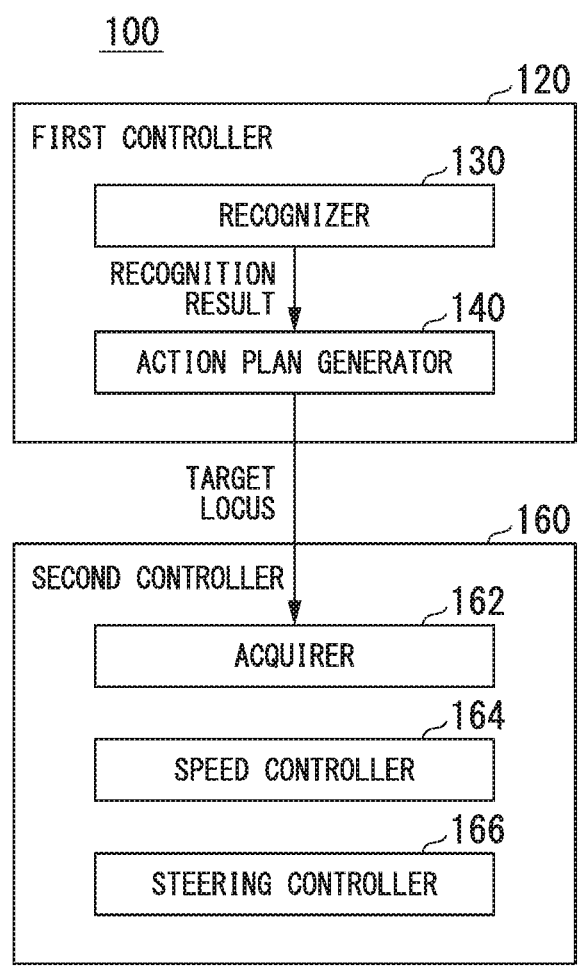
FIG. 2 is a functional configuration diagram of a first controller and a second controller.

FIG. 2 is a functional configuration diagram of the first controller 120 and the second controller 160. The first controller 120, for example, includes a recognizer 130 and an action plan generator 140. The action plan generator 140 is one example of a "driving controller". The first controller 120, for example, simultaneously implements functions using artificial intelligence (AI) and functions using a model provided in advance. For example, a function of "recognizing an intersection" may be implemented by executing recognition of an intersection using deep learning or the like and recognition based on conditions given in advance (a signal, road markings, and the like that can be used for pattern matching are present) at the same time, assigning scores to processing results of both recognition processes, and comprehensively evaluating the processing results to which the scores have been assigned. Accordingly, the reliability of automated driving is secured.

The recognizer 130 recognizes states such as a position, a speed, an acceleration, and the like of each object present in the vicinity of the subject vehicle M on the basis of information input from the camera 10, the radar device 12, and the finder 14 through the object recognizing device 16. The position of an object, for example, is recognized as a position on an absolute coordinate system having a representative point (the center of gravity, the center of a driving shaft, or the like) of the subject vehicle M as its origin and is used for control. The position of an object may be represented as a representative point such as the center of gravity or a corner of an object or may be represented as a representative area. A "state" of an object may include an acceleration, a jerk, or an "action state" (for example, whether or not the object is changing lanes or will change lanes) of an object.

The recognizer 130, for example, recognizes a lane (running lane) in which the subject vehicle M is running. For example, the recognizer 130 may recognize a running lane by comparing a pattern of road partition lines acquired from the second map information 62 (for example, an array of solid lines and broken lines) with a pattern of road partition lines in the vicinity of the subject vehicle M that has been recognized from an image captured by the camera 10. The recognizer 130 is not limited to recognizing road partition lines and may recognize a running lane by recognizing running lane boundaries (road boundaries) including a road partition line, a road shoulder, curbstones, a median strip, a guardrail, and the like. In the recognition, the position of the subject vehicle M acquired from the navigation device 50 or a result of the process executed by an INS may be additionally taken into account. In addition, the recognizer 130 may recognize a temporary stop line, an obstacle, a red light, a tollgate, and other road events.

When a running lane is recognized, the recognizer 130 recognizes a position and a posture of the subject vehicle M with respect to the running lane. The recognizer 130, for example, may recognize a deviation of a reference point on the subject vehicle M from the center of the lane and an angle of the advancement direction of the subject vehicle M formed with respect to a line along the center of the lane as a relative position and a posture of the subject vehicle M with respect to the running lane. Instead of this, the recognizer 130 may recognize a position of a reference point on the subject vehicle M with respect to a one side end part (a road partition line or a road boundary) of the running lane or the like as a relative position of the subject vehicle M with respect to the running lane.

The action plan generator 140 basically runs on a recommended lane determined by the recommended lane determiner 61 and generates a target locus along which the subject vehicle M will run automatically (independently of responding to a driver's operation) in the future such that a surroundings status of the subject vehicle M can be responded to. The target locus, for example, includes a speed element. For example, the target locus is represented by sequentially aligning places (locus points) at which the subject vehicle M is to arrive. A locus point is a place at which the subject vehicle M will arrive at respective predetermined running distances (for example, about every several [m]) as distances along the road, and separately, a target speed and a target acceleration for each of predetermined sampling times (for example, a fraction of a [sec]) are generated as a part of the target locus. A locus point may be a position at which the subject vehicle M will arrive at a sampling time for each of predetermined sampling times. In such a case, information of a target speed or a target acceleration is represented using intervals between the locus points.

The action plan generator 140 may set an event of automated driving when a target locus is generated. As events of automated driving, there are a constant-speed running event, a low-speed following running event, a lane change event, a branching event, a merging event, an overtaking event, and the like. The action plan generator 140 generates a target locus according to an operating event.

The second controller 160 performs control of the running driving force output device 200, the brake device 210, and the steering device 220 such that the subject vehicle M passes along a target locus generated by the action plan generator 140 at a scheduled time.

The second controller 160, for example, includes an acquirer 162, a speed controller 164, and a steering controller 166. The acquirer 162 acquires information of a target locus (a locus point) generated by the action plan generator 140 and stores the target locus information in a memory (not shown). The speed controller 164 controls the running driving force output device 200 or the brake device 210 on the basis of a speed element accompanying the target locus stored in the memory. The steering controller 166 controls the steering device 220 in accordance with a degree of curvature of the target locus stored in the memory. The processes of the speed controller 164 and the steering controller 166, for example, are implemented by a combination of feed forward control and feedback control. For example, the steering controller 166 may execute feed forward control according to the curvature of a road in front of the subject vehicle M and feedback control based on a deviation from the target locus in combination.

The running driving force output device 200 outputs a running driving force (torque) used for a vehicle to run to driving wheels. The running driving force output device 200, for example, includes a combination of an internal combustion engine, an electric motor, a transmission, and the like and an ECU controlling these components. The ECU controls the components described above in accordance with information input from the second controller 160 or information input from the driving operator 80.

The brake device 210, for example, includes a brake caliper, a cylinder that delivers hydraulic pressure to the brake caliper, an electric motor that generates hydraulic pressure in the cylinder, and a brake ECU. The brake ECU performs control of the electric motor in accordance with information input from the second controller 160 or information input from the driving operator 80 such that a brake torque according to a brake operation is output to each vehicle wheel. The brake device 210 may include a mechanism delivering hydraulic pressure generated in accordance with an operation on the brake pedal included in the driving operators 80 to the cylinder through a master cylinder as a backup. The brake device 210 is not limited to the configuration described above and may be an electronically-controlled hydraulic brake device that delivers hydraulic pressure in the master cylinder to a cylinder by controlling an actuator in accordance with information input from the second controller 160.

The steering device 220, for example, includes a steering ECU and an electric motor. The electric motor, for example, changes the direction of the steering wheel by applying a force to a rack and pinion mechanism. The steering ECU changes the direction of the steering wheel by driving an electric motor in accordance with information input from the second controller 160 or information input from the driving operator 80.

[Process Executed when Subject Vehicle Run on Narrow Road]

Figure 3:
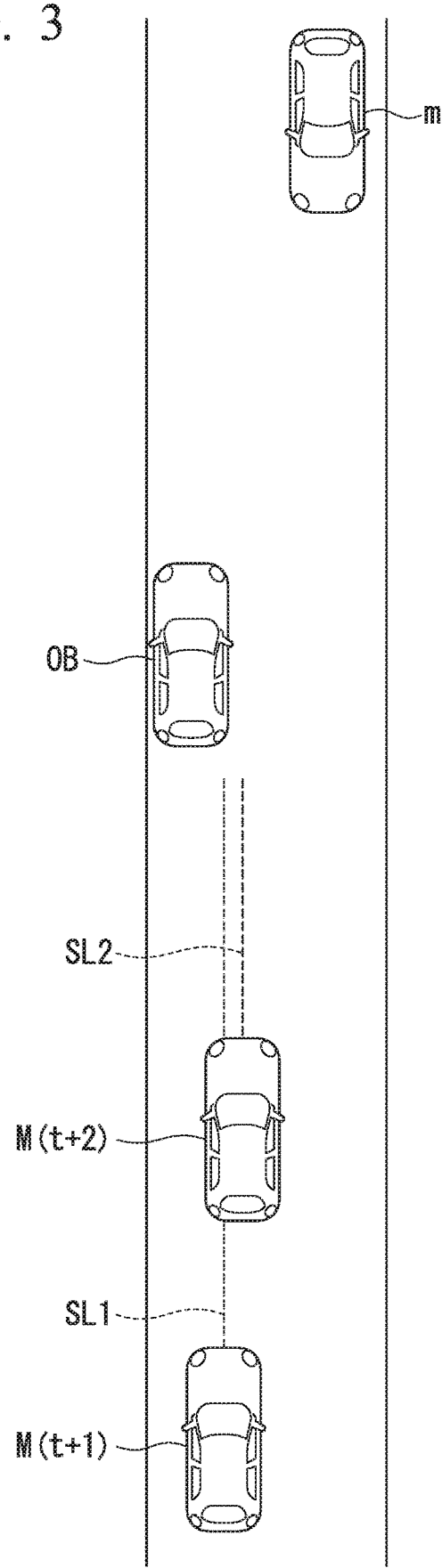
FIG. 3 is a diagram showing a view (1) in which a subject vehicle M runs on a narrow road.

FIG. 3 is a diagram showing a view (1) in which a subject vehicle M runs on a narrow road. The action plan generator 140 causes the subject vehicle M to run on the basis of a first reference line SL1 deviating to one side (for example, a left side) of a road in a case in which an obstacle has not been recognized in an advancement direction of the subject vehicle M by the recognizer 130 and causes the subject vehicle M to run on the basis of a second reference line set on an other side of the road from the first reference line SL1 and then avoid an obstacle in a case in which the obstacle OB (a target obstacle) has been recognized by the recognizer 130. The obstacle OB (the target obstacle), for example, is an obstacle that is present nearest in the advancement direction of the subject vehicle M. "Near an obstacle OB", for example, represents being within a predetermined distance from the obstacle OB.

The shown example represents a view in which the subject vehicle M runs on a specific road. Here, the specific road, for example, is a road on which the subject vehicle M can pass an oncoming vehicle (or a bicycle or any other moving object) on a course with a predetermined marginal width. More specifically, the specific road is a road having a road width with which, in the case of passing the obstacle OB, one of the subject vehicle M and an oncoming vehicle m needs to wait in front of the obstacle OB until the other vehicle passes the obstacle OB.

An "obstacle" is an object (an object having an influence) inhibiting running of the subject vehicle M in a case in which the subject vehicle M runs on the basis of the first reference line SL1. More specifically, the "obstacle", as shown in the drawing, may be a vehicle having stopped or may be an object (for example, a bicycle, an electricity post, a sign board, or the like that has been installed) that needs to be avoided by a vehicle when running or a road in a state (unevenness of the road or a state of being under construction) that needs to be avoided by the vehicle when running.

The "first reference line SL1" or the "second reference line SL2" is a target locus, which is generated by the action plan generator 140, when the subject vehicle M runs. The subject vehicle M is controlled such that a reference position of the subject vehicle M (for example, the center of the subject vehicle M in the horizontal direction) passes along the target locus.

The "first reference line SL1", for example, is set to the left side of the center of the width of the road. The first reference line SL1, for example, is a target locus along which the subject vehicle M runs when it is assumed that the subject vehicle M and an oncoming vehicle pass each other on a specific road in a state in which an obstacle OB is not present.

The "second reference line SL2" is set to the right side of the first reference line SL1. The second reference line is defined between the first reference line SL1 and a target locus of a case in which the subject vehicle M runs without coming into contact with the obstacle OB. The second reference line may be defined as being midway between the first reference line SL1 and the target locus described above. In the case in which the second reference line is defined as being midway therebetween, the behavior of the vehicle M does not cause a user using the subject vehicle M to have a feeling of strangeness regarding the behavior of the vehicle M due to the amount of movement of the subject vehicle M in the horizontal direction being the same degree each time. The second reference line SL2, for example, may be a target locus of a case in which the subject vehicle M runs without coming into contact with the obstacle OB.

As described above, the action plan generator 140 causes the subject vehicle M ("M(t+1)" in the drawing) to run on the basis of the first reference line SL1, and, in a case in which an obstacle OB has been recognized by the recognizer 130, the action plan generator 140 causes the subject vehicle M ("M(t+2)" in the drawing) to run on the basis of the second reference line SL2, whereby a detection range of sensors (the camera 10, the radar 12, and the finder 14) of the subject vehicle M can be broadened. The presence of the subject vehicle M or the intention of advancement of the subject vehicle M can be notified to an oncoming vehicle. As a result, the subject vehicle M can be appropriately controlled in accordance with traffic conditions.

[View 2]

Figure 4:
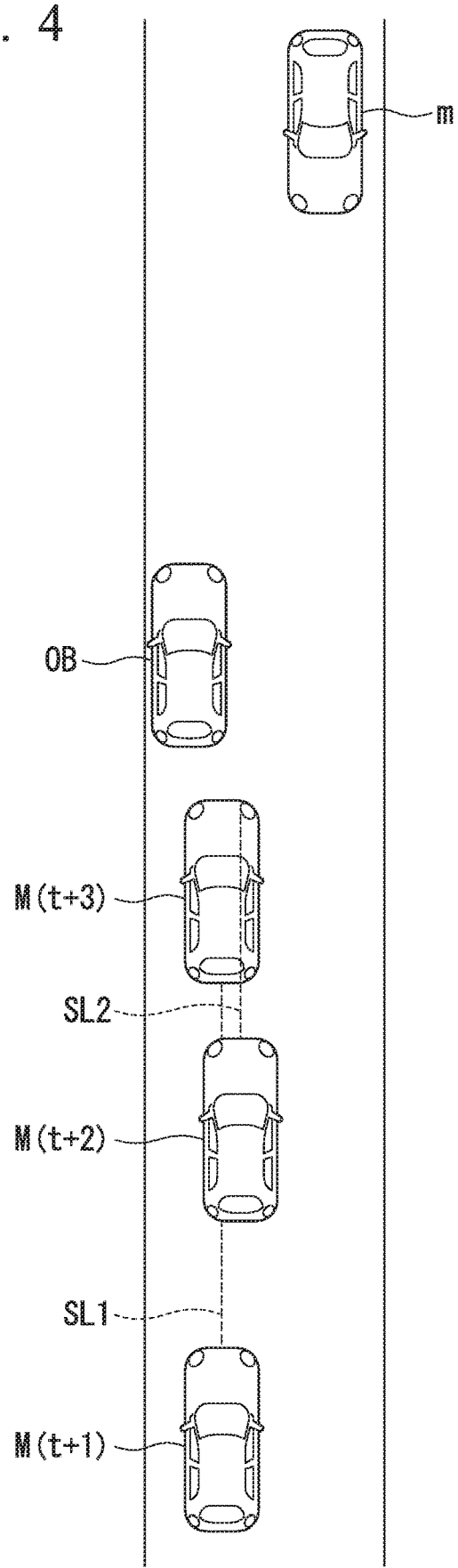
FIG. 4 is a diagram showing a view (2) in which a subject vehicle M runs on a narrow road.

FIG. 4 is a diagram showing a view (2) in which a subject vehicle M runs on a narrow road. After causing the subject vehicle M to run on the basis of the second reference line SL2, in a case in which an oncoming vehicle m present near the obstacle OB is recognized by the recognizer 130, the action plan generator 140 controls the subject vehicle M such that the subject vehicle M becomes further away from the oncoming vehicle m in relation to a distance between the subject vehicle M and the oncoming vehicle m in the horizontal direction than in a case in which the subject vehicle M runs on the basis of the second reference line SL2. In this case, the action plan generator 140 controls the subject vehicle M on the basis of the first reference line SL1 such that the subject vehicle M becomes further away from the oncoming vehicle m and causes the subject vehicle M to slowly run or stop in front of the obstacle OB.

"An oncoming vehicle present near the obstacle", for example, is an oncoming vehicle present within a predetermined distance from the obstacle OB. More specifically, "an oncoming vehicle present near an obstacle" is a vehicle that is present within a predetermined distance from the obstacle OB.

"The subject vehicle M is controlled such that the subject vehicle M becomes further away from the oncoming vehicle m in relation to a distance between the subject vehicle M and the oncoming vehicle m in the horizontal direction" is performing control of the subject vehicle M to run on the left side of the second reference line SL2. More specifically, "the subject vehicle M is controlled such that the subject vehicle M becomes further away from the oncoming vehicle m in relation to a distance between the subject vehicle M and the oncoming vehicle m in the horizontal direction (a distance in a vehicle width direction)" is causing the subject vehicle M ("M(t+3)" in the drawing) to run on the basis of the first reference line SL1.

As described above, in a case in which an obstacle OB has been recognized by the recognizer 130, the action plan generator 140, for example, causes the subject vehicle M to run on the basis of the first reference line SL1 instead of the second reference line SL2, whereby the oncoming vehicle m can smoothly pass. As a result, the subject vehicle M can be appropriately controlled in accordance with traffic conditions.

[View 3]

Figure 5:
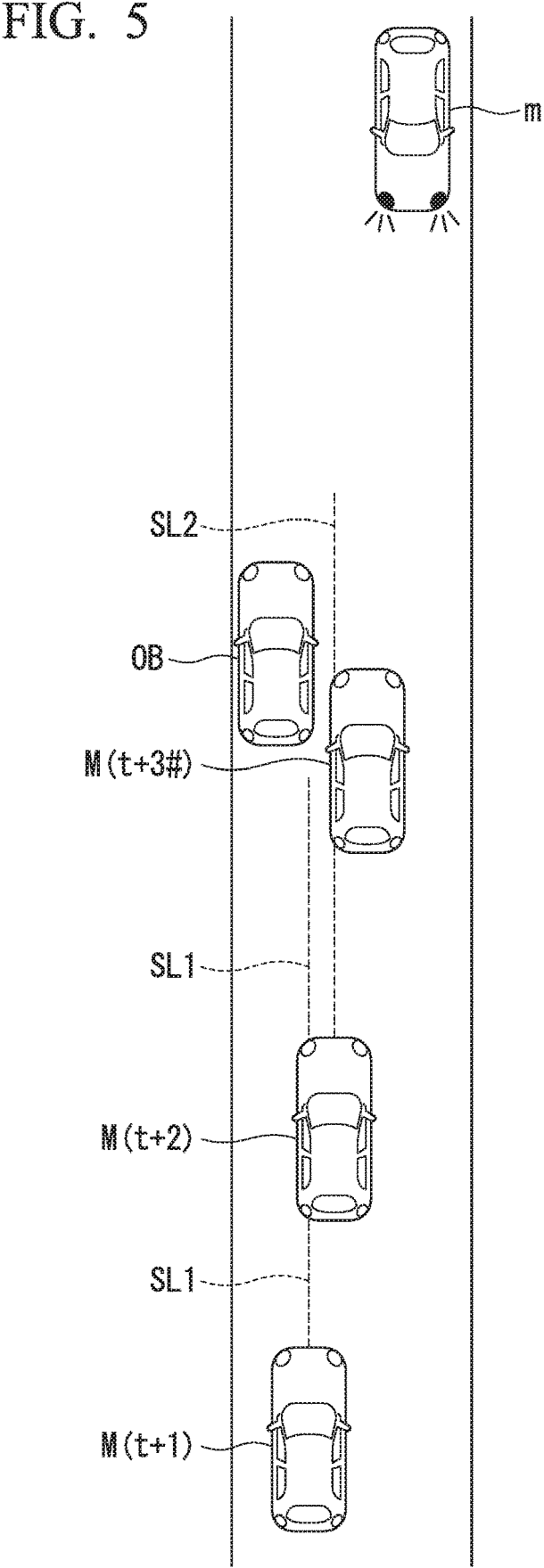
FIG. 5 is a diagram showing a view (3) in which a subject vehicle M runs on a narrow road.

FIG. 5 is a diagram showing a view (3) in which a subject vehicle M runs on a narrow road. After causing the subject vehicle M to run on the basis of the second reference line SL2, in a case in which an oncoming vehicle m is recognized by the recognizer 130, and the oncoming vehicle m satisfies a predetermined condition (to be described later), the action plan generator 140 causes the subject vehicle M to run on the basis of the second reference line SL2. Then, the action plan generator 140 causes the subject vehicle M to run to avoid and pass the target object OB (see "M(t+3 #)" in the drawing).

In a case in which the oncoming vehicle m does not satisfy the predetermined condition, the action plan generator 140 controls the subject vehicle M such that the subject vehicle M becomes further away from the oncoming vehicle m in relation to a distance in the horizontal direction (on the basis of the first reference line SL1) without causing the subject vehicle M to run on the basis of the second reference line SL2.

The "predetermined condition" is a condition under which it is appropriate for the subject vehicle M to run near the center of the road. The "predetermined condition", for example, represents an intention indicating that the subject vehicle M has a priority level higher than the obstacle OB in relation to the running of the oncoming vehicle m present on the side of the advancement direction of the subject vehicle M on the road. "Indicating an intention representing that the priority level is high", for example, as shown in the drawing, represents that the oncoming vehicle m turns on/off of a head light or turns on/off of a hazard lamp. "Indicating an intention representing that the priority level is high", for example, represents that a vehicle occupant of the oncoming vehicle m makes a predetermined gesture. The predetermined gesture is urging to pass the obstacle OB facing the subject vehicle M. The recognizer 130 determines whether or not a predetermined gesture has been made on the basis of a result of recognition acquired by the object recognizing device 16 by referring to a template stored in a storage device, which is not shown in the drawing, of the automated driving control device 100 in advance.

The "predetermined condition", for example, may be a condition that an oncoming vehicle m present on a side in a direction of further advancement than the obstacle OB stops or a condition that an oncoming vehicle m present on a side in a direction of further advancement than the obstacle OB decelerates by a predetermined degree or more before a predetermined distance from the obstacle OB. The "predetermined condition", for example, may be a condition that a vehicle occupant is not riding on the oncoming vehicle m.

As described above, in a case in which the oncoming vehicle m satisfies the predetermined condition, the action plan generator 140 can pass the obstacle OB by smoothly avoiding it by causing the subject vehicle M to run on the basis of the second reference line SL2. Since the amount of movement of the subject vehicle M to the left side or the right side can be inhibited, the comfort of a vehicle occupant can be improved. In addition, the subject vehicle M can be appropriately controlled in accordance with traffic conditions.

[View 4]

Figure 6:
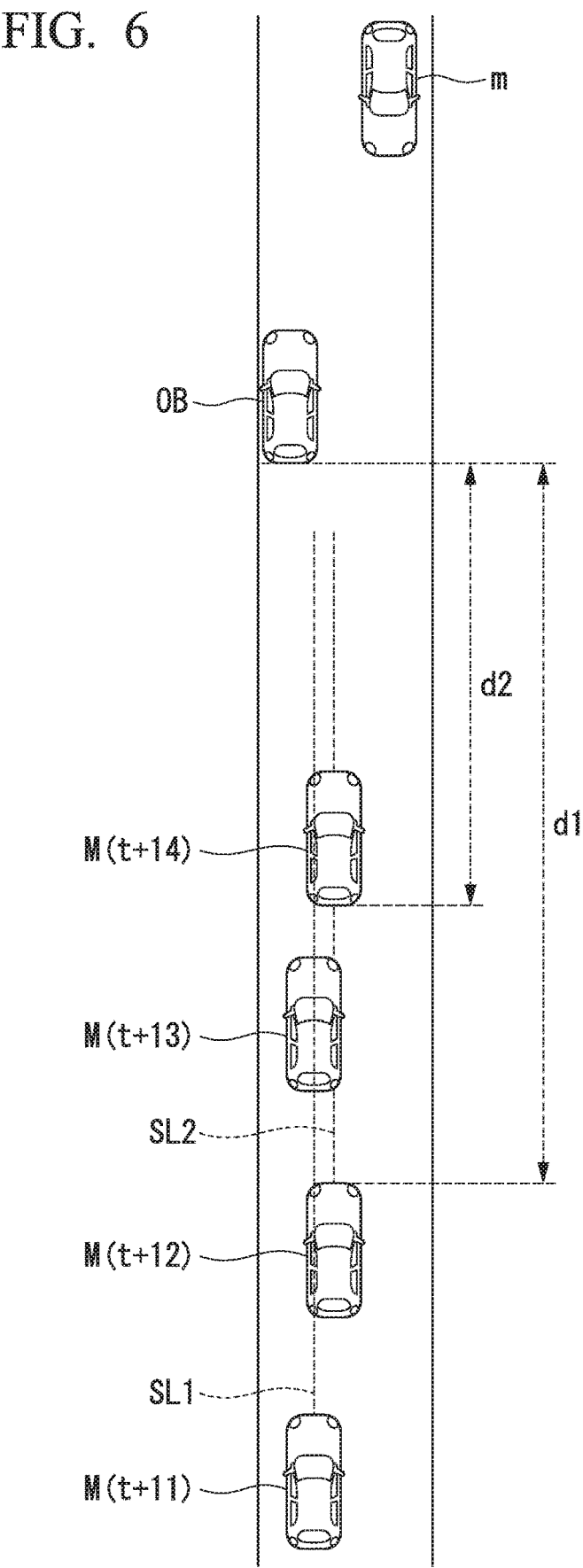
FIG. 6 is a diagram showing a view (4) in which a subject vehicle M runs on a narrow road.

FIG. 6 is a diagram showing a view (4) in which a subject vehicle M runs on a narrow road. After causing the subject vehicle M to run on the basis of the second reference line SL2, in a case in which an oncoming vehicle m in a stop state is recognized by the recognizer 130, the action plan generator 140 determines to cause the subject vehicle M to run on the basis of the second reference line SL2 in accordance with a distance from the subject vehicle M to an obstacle OB or to control the subject vehicle M such that the subject vehicle M and the oncoming vehicle m become further away from the second reference line SL2 in relation to a distance in the horizontal direction.

Whether or not the oncoming vehicle m is in a stop state is determined on the basis of results of recognition of the target vehicle m in the past recognized by the recognizer 130. For example, in a case in which the oncoming vehicle m stops until a predetermined period from the present, the oncoming vehicle m is determined as being in a stop state. In a case in which the oncoming vehicle m stops until the predetermined period from the present, and a vehicle occupant is not riding on the oncoming vehicle m, the oncoming vehicle m may be determined as being in the stop state. At night, until a predetermined period from the present, in a case in which the oncoming vehicle m stops, and lights of the oncoming vehicle m are not turned on, the oncoming vehicle m may be determined as being in a stop state.

For example, in a case in which an obstacle OB is recognized in a state in which the subject vehicle M ("M (t+11)" in the drawing) is controlled on the basis of the first reference line SL1, the action plan generator 140 controls the subject vehicle M ("M(t+12)" in the drawing) on the basis of the second reference line SL2. At this time, in a case in which the oncoming vehicle m recognized by the recognizer 130 is in a stop state, and a distance to the obstacle OB is equal to or longer than a set distance d1, the action plan generator 140 controls the subject vehicle M on the basis of the first reference line SL1.

In a case in which the oncoming vehicle m recognized by the recognizer 130 is in a stop state, and a distance to the obstacle OB is not equal to or longer than the set distance d1 (for example, in the case of a distance d2 (<d1)), the action plan generator 140 controls the subject vehicle M on the basis of the second reference line SL2. Then, the action plan generator 140 causes the subject vehicle M to run to pass a target object OB by avoiding it.

As described above, in a case in which the oncoming vehicle m is in a stop state, and in a case in which the distance to the obstacle OB is equal to or longer than the set distance, by controlling the subject vehicle M on the basis of the first reference line SL1, influences on traffic participants (for example, a vehicle, a pedestrian, and the like) present in the vicinity of the subject vehicle M can be inhibited.

In a case in which the oncoming vehicle m is in a stop state, in a case in which the distance to the object OB is shorter than the set distance, by controlling the subject vehicle M on the basis of the second reference line SL2, the subject vehicle M can be controlled to pass the target object OB by smoothly avoiding it while influences on traffic participants present in the vicinity of the subject vehicle M are inhibited. As a result, the subject vehicle M can be appropriately controlled in accordance with traffic conditions.

In the view 4 described above, in a case in which the distance to the obstacle OB is shorter than the set distance, also in a state in which the oncoming vehicle m is not in the stop state, in a case in which it is assumed that the subject vehicle M has passed by the obstacle OB, in a case in which it is determined that the oncoming vehicle m does not become an obstacle for smoothly passing by the obstacle OB, the subject vehicle M may run on the basis of the second reference line and, after passing by the obstacle OB, run on the basis of the first reference line.

The oncoming vehicle m not becoming an obstacle for smoothly passing by the obstacle OB is a case in which the action plan generator 140 determines that the oncoming vehicle m is separate by a predetermined distance or more from the obstacle OB when the subject vehicle M passes by the obstacle OB on the basis of the position of the obstacle OB, the position and the speed of the subject vehicle M, and the position and the speed of the oncoming vehicle m. Here, the predetermined distance is a distance determined on the basis of the speed of the oncoming vehicle m and is set longer as the speed of the oncoming vehicle m becomes higher.

In the view 4 described above, while the oncoming vehicle m is assumed to be present, in addition to (or instead of) this, in a case in which an oncoming vehicle m is not present, and the distance to the obstacle OB is not equal to or longer than the set distance d1, the action plan generator 140 may control the subject vehicle M on the basis of the second reference line SL2.

[Flowchart]

Figure 7:
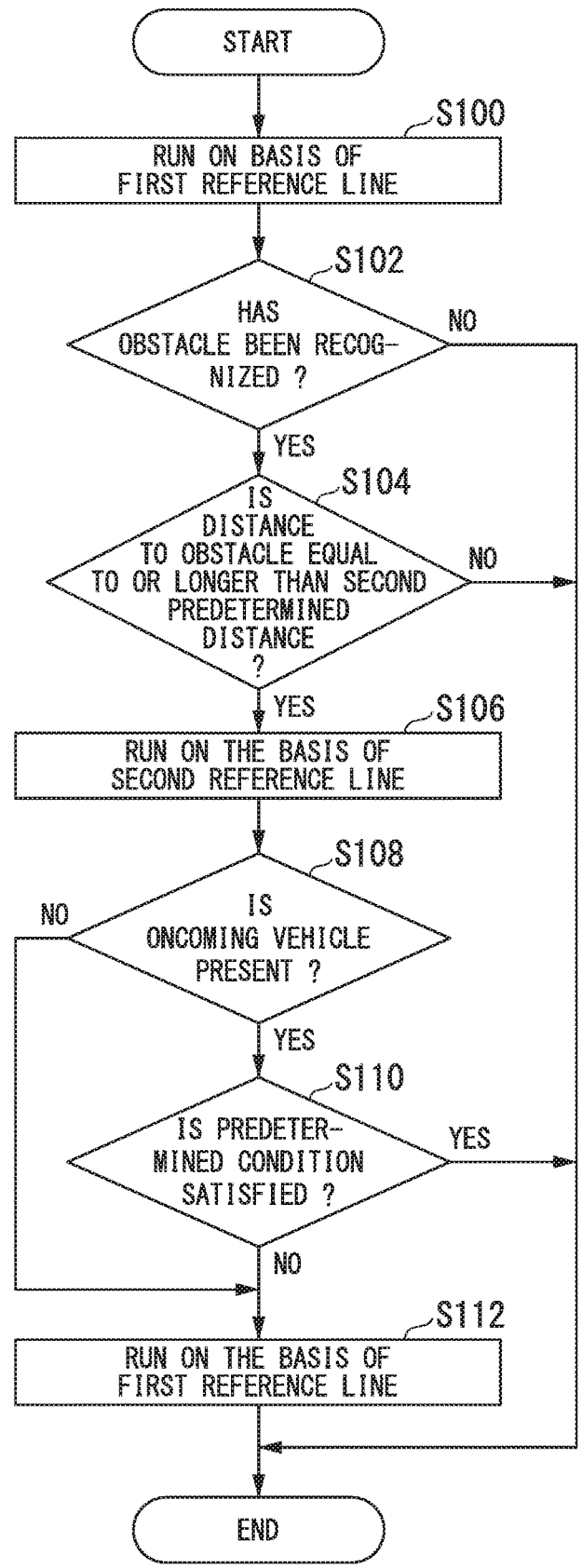
FIG. 7 is a flowchart showing one example of the flow of a process executed by an automated driving control device.

FIG. 7 is a flowchart showing one example of the flow of a process executed by the automated driving control device 100. This process is one example of a case in which a distance between the subject vehicle M and the obstacle OB reaches a first predetermined distance in a case in which the subject vehicle M runs along the first reference line SL1

First, the action plan generator 140 performs control of a vehicle to run on the basis of the first reference line (Step S100). Next, the action plan generator 140 determines whether or not an obstacle has been recognized in the advancement direction of the subject vehicle M (Step S102). In a case in which an obstacle has not been recognized, the process of one routine of this flowchart ends.

On the other hand, in a case in which an obstacle has been recognized, the action plan generator 140 determines whether or not a distance between the subject vehicle M and the obstacle is equal to or longer than a second predetermined distance (whether or not the subject vehicle M and the obstacle approach each other) (Step S104). The second predetermined distance, for example, is an arbitrary distance and is a distance shorter than the first predetermined distance described above or several meters. In a case in which the distance between the subject vehicle M and the obstacle is not equal to or longer than the second predetermined distance, the process of one routine of this flowchart ends. In this case, for example, a process different from the process of this flowchart is executed. Here, the different process, for example, is a process in which the subject vehicle M slowly runs in front of the obstacle or stops once.

On the other hand, in a case in which the distance between the subject vehicle M and the obstacle is equal to or longer than the second predetermined distance, the action plan generator 140 performs control of the vehicle to run on the basis of the second reference line (Step S106). In this way, the presence of the subject vehicle M can be notified to an oncoming vehicle that may be present in the advancement direction. There are cases in which the detection range of the sensors of the subject vehicle M can be broadened, and, for example, an object that cannot be detected due to an influence of the obstacle can be detected.

Next, the action plan generator 140 determines whether or not an oncoming vehicle is present (Step S108). In a case in which an oncoming vehicle is not present, the action plan generator 140 performs control of the vehicle to run on the basis of the first reference line (Step S112). In a case in which the distance between the subject vehicle M and the obstacle OB is equal to or longer than the second predetermined distance and is shorter than a third predetermined distance, the subject vehicle M may pass the obstacle OB by avoiding it. Here, the third predetermined distance is a distance set between the first predetermined distance and the second predetermined distance.

In a case in which an oncoming vehicle is not present in the process of Step S108, the action plan generator 140 may control the subject vehicle M on the basis of the second reference line instead of the first reference line. Then, in a case in which the distance between the subject vehicle M and the obstacle becomes equal to or longer than the second predetermined distance and shorter than the third predetermined distance, the subject vehicle M is controlled on the basis of the second reference line, and the subject vehicle M passes by the obstacle.

On the other hand, in a case in which an oncoming vehicle is present, the action plan generator 140 determines whether or not the predetermined condition described above is satisfied (Step S110). In a case in which the predetermined condition is satisfied, the process of one routine of this flowchart ends. On the other hand, in a case in which the predetermined condition is not satisfied, the action plan generator 140 performs control of the vehicle to run on the basis of the first reference line (Step S112). In this way, the process of one routine of this flowchart ends.

Figure 8:
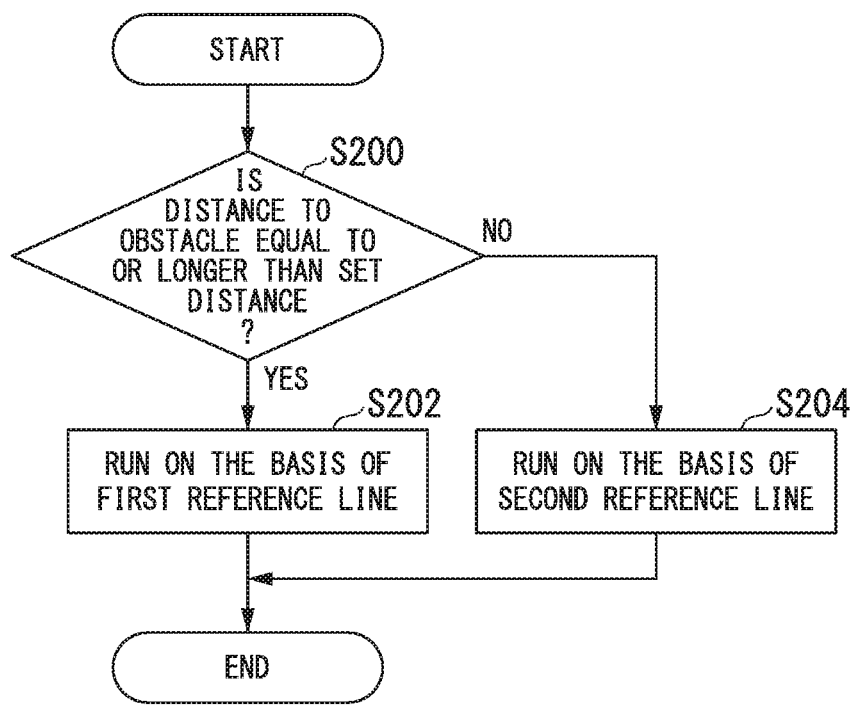
FIG. 8 is a flowchart showing one example of the flow of a process executed after the process of Step S110 in the flowchart shown in FIG. 7.

FIG. 8 is a flowchart showing one example of the flow of a process executed after the process of Step S110 in the flowchart shown in FIG. 7. First, in a case in which it is determined that the predetermined condition is satisfied in Step S110 of the flowchart shown in FIG. 7 (for example, in a case in which the oncoming vehicle recognized in Step S108 is during stop), the action plan generator 140 determines whether or not a distance between the subject vehicle M and the obstacle is equal to or longer than a set distance (for example, whether or not the distance exceeds the third predetermined distance) (Step S200).

In a case in which the distance between the subject vehicle M and the obstacle is equal to or longer than the set distance, the action plan generator 140 performs control of the vehicle to run on the basis of the first reference line (Step S202). On the other hand, in a case in which the distance between the subject vehicle M and the obstacle is not equal to or longer than the set distance, the action plan generator 140 performs control of the vehicle to run on the basis of the second reference line (Step S204). Then, the subject vehicle M passes by the obstacle. In this way, the process of this flowchart ends.

As described above, the action plan generator 140 causes the subject vehicle M to run on the basis of the first reference line or the second reference line in accordance with surrounding traffic conditions, whereby the subject vehicle M can be appropriately controlled in accordance with the traffic conditions.

Another Example 1

Figure 9:
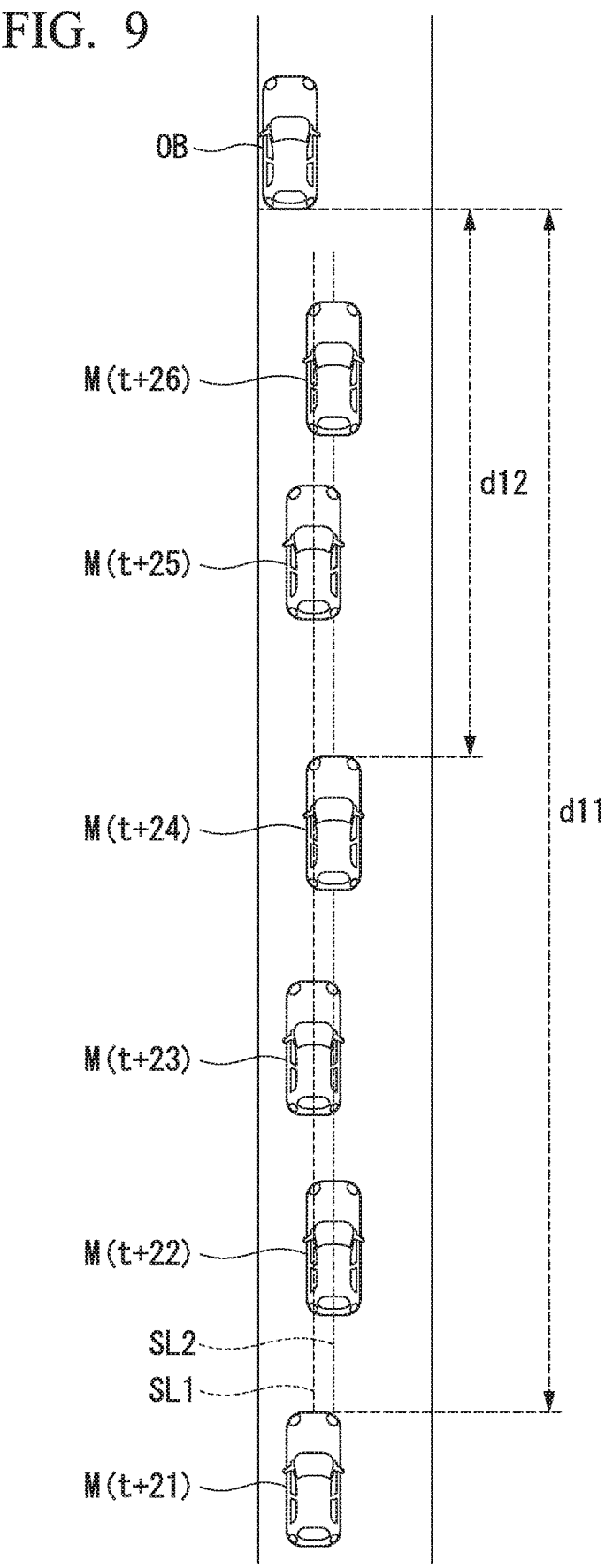
FIG. 9 is a diagram showing another example 1.

FIG. 9 is a diagram showing another example 1. In a case in which the subject vehicle M is separate from the obstacle OB by a distance d11, the action plan generator 140, for example, controls the subject vehicle M ("M(t+21)" in the drawing) on the basis of the first reference line SL1. In a case in which the subject vehicle M reaches a distance d11 from the obstacle OB, the action plan generator 140, for example, during a predetermined time, after controlling the subject vehicle M ("M(t+22)" in the drawing) on the basis of the second reference line SL2, controls the subject vehicle M ("M(t+23)" in the drawing) on the basis of the first reference line. Then, the action plan generator 140, for example, repeats control based on the first reference line SL1 and control based on the second reference line SL2.

In a case in which the subject vehicle M reaches a distance d12 (<d11) from the obstacle OB, the action plan generator 140, for example, in the control based on the second reference line SL2 out of the controls described above, in a case in which an oncoming vehicle m is not present or when a predetermined condition is satisfied even in a case in which an oncoming vehicle m is present, after controlling the subject vehicle M ("M(t+26)" in the drawing) based on the second reference line SL2, causes the subject vehicle to pass the obstacle OB by avoiding it. For example, in a case in which the subject vehicle M reaches a distance d12 from the obstacle OB, the process of a flowchart shown in FIG. 7 is executed. The distance d12 may be either the same as or different from the distance d1.

In accordance with the process described above, the action plan generator 140 causes the subject vehicle M to run on the basis of the first reference line or the second reference line in accordance with a distance between the subject vehicle M and the obstacle, and accordingly, the action plan generator 140 can appropriately control the subject vehicle M in accordance with traffic conditions.

Another Example 2

Figure 10:
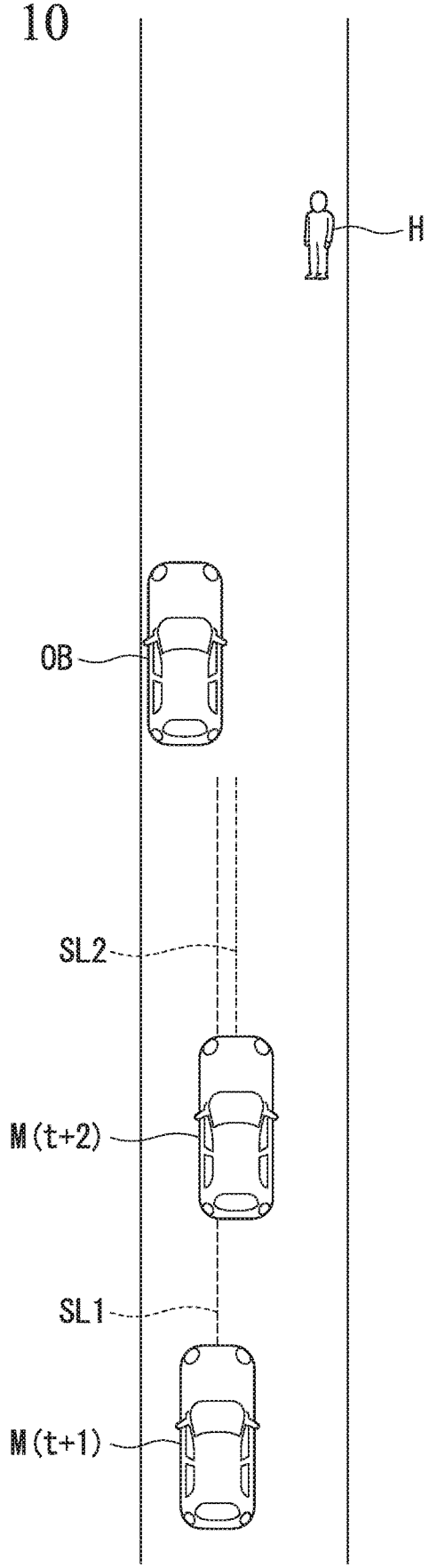
FIG. 10 is a diagram showing another example 2.

FIG. 10 is a diagram showing another example 2. In the example described above, although an example in which an oncoming vehicle m is presented on a specific road has been described, in a case in which a pedestrian is present instead of an oncoming vehicle m on a specific road, each control described above may be executed. Among the controls described above, some thereof may be changed. For example, in a case in which a pedestrian is present within a predetermined distance from the obstacle OB, or in a case in which a distance between the subject vehicle M and the obstacle OB is within a set distance d2, the subject vehicle M may be returned to a position on the first reference line SL1 and stop or may stop until the pedestrian passes by the subject vehicle M at a position on the second reference line SL2. In accordance with the process described, the subject vehicle M can be appropriately control in accordance with traffic conditions.

According to the embodiment described above, the recognizer 130 recognizing a surroundings status of the subject vehicle M and the action plan generator 140 controlling at least steering of the subject vehicle M on the basis of the surroundings status recognized by the recognizer 130 are included, and the action plan generator 140 causes the subject vehicle M to run on the basis of the first reference line deviating to one side of a road in a case in which an obstacle is not recognized in the advancement direction of the subject vehicle M by the recognizer 130 and causes the subject vehicle M to run on the basis of the second reference line disposed on an other side of the road from the first reference line in a case in which an obstacle is recognized by the recognizer 130, and accordingly, the vehicle can be appropriately controlled in accordance with traffic conditions.

[Hardware Configuration]

Figure 11:
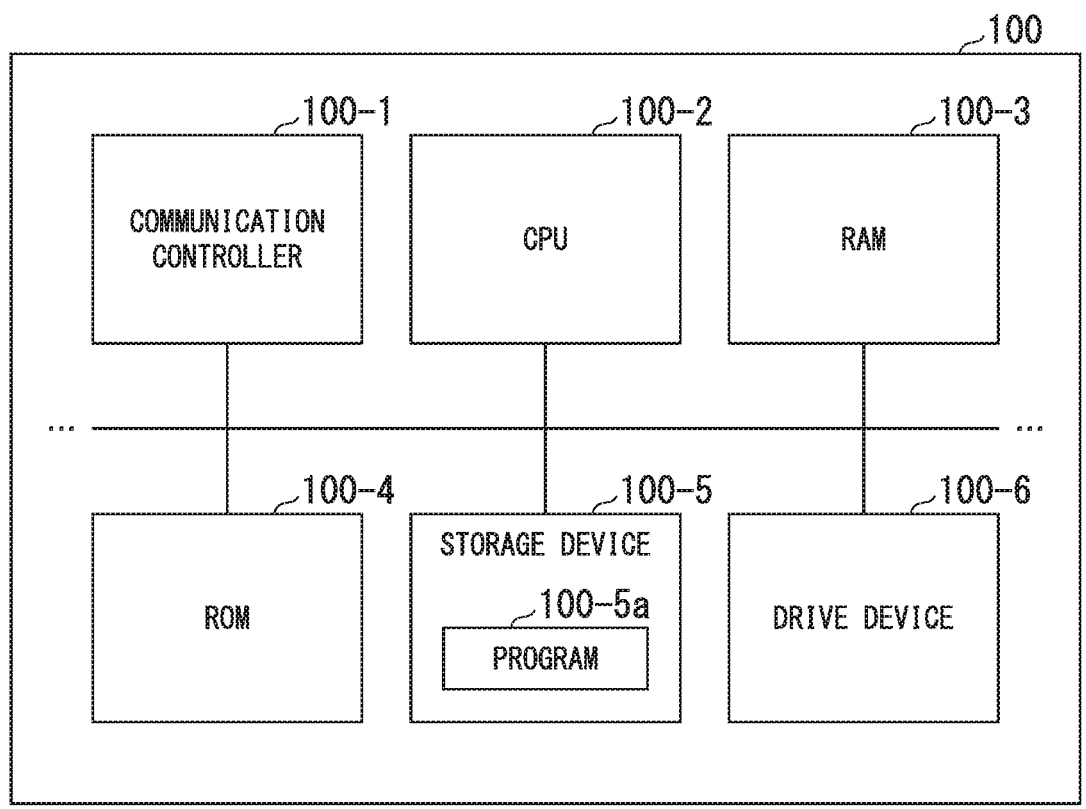
FIG. 11 is a diagram showing one example of the hardware configuration of an automated driving control device according to an embodiment.

FIG. 11 is a diagram showing one example of the hardware configuration of an automated driving control device 100 according to an embodiment. As shown in the drawing, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or an hard disk drive (HDD), a drive device 100-6, and the like are interconnected through an internal bus or a dedicated communication line. The communication controller 100-1 communicates with constituent elements other than the automated driving control device 100. A program 100-5a executed by the CPU 100-2 is stored in the storage device 100-5. This program is expanded into the RAM 100-3 by a direct memory access (DMA) controller (not shown in the drawing) or the like and is executed by the CPU 100-2. In this way, some or all of the recognizer 130, the action plan generator 140, and the second controller 160 are realized.

The embodiment described above can be represented as below.

A vehicle control device including a storage device storing a program and a hardware processor and configured such that the hardware processor, by executing the program stored in the storage device, recognizes a surroundings status of a vehicle, controls at least steering of the vehicle on the basis of the recognized surroundings status, causes the vehicle to run based on a first reference line deviating to one side of a road in a case in which an obstacle is not recognized in the advancement direction of the vehicle, and avoid the obstacle after causing the vehicle to run on the basis of a second reference line disposed on an other side of the road from the first reference line in a case in which an obstacle is recognized.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
   a recognizer that recognizes a surroundings status of a vehicle; and
   a driving controller that controls at least steering of the vehicle based on the surroundings status recognized by the recognizer,
   wherein, based on the recognizer not recognizing a target obstacle in an advancement direction of the vehicle, the driving controller causes the vehicle to run based on a first reference line that deviates to a first side of a road, and
   based on the recognizer recognizing the target obstacle in the advancement direction of the vehicle, the driving controller causes the vehicle to run based on a second reference line disposed closer to a center of the road than the first reference line, wherein the vehicle avoids the target obstacle based on the second reference line, and wherein the first reference line and the second reference line are different reference lines,
   wherein, in a case in which at least one oncoming vehicle that is near the target obstacle and on a second side of the road, wherein the second side is laterally opposite the first side of the road, is recognized by the recognizer after causing the vehicle to run based on the second reference line, the driving controller causes the vehicle to run such that a first distance between the vehicle and the oncoming vehicle, in a horizontal direction, is further away from the oncoming vehicle as compared to a second distance between the vehicle and the oncoming vehicle in a case in which the vehicle runs based on the second reference line.

2. The vehicle control system according to claim 1, wherein the target obstacle is an object that inhibits running of the vehicle on the first reference line.

3. The vehicle control system according to claim 1, wherein, in a case in which the oncoming vehicle is recognized after causing the vehicle to run based on the second reference line, the driving controller causes the vehicle to run based on the first reference line.

4. The vehicle control system according to claim 1, wherein, in a case in which the oncoming vehicle is recognized after causing the vehicle to run based on the second reference line, the driving controller causes the vehicle to run such that a distance of the vehicle in the horizontal direction becomes further away from the oncoming vehicle, and wherein the vehicle slows or stops prior to reaching the target obstacle.

5. The vehicle control system according to claim 1, wherein, in a case in which the oncoming vehicle is recognized after causing the vehicle to run based on the second reference line, and the oncoming vehicle satisfies a predetermined condition, the driving controller causes the vehicle to run based on the second reference line and avoid the target obstacle after causing the vehicle to run based on the second reference line.

6. The vehicle control system according to claim 5, wherein, in a case in which the oncoming vehicle does not satisfy the predetermined condition, the driving controller causes the vehicle to run such that a distance of the vehicle in the horizontal direction becomes further away from the oncoming vehicle without causing the vehicle to run based on the second reference line.

7. The vehicle control system according to claim 5, wherein the predetermined condition is a condition that the oncoming vehicle, present on a side in a direction of further advancement than the target obstacle, shows an intention that indicates that a priority level of the vehicle relating to running on the road is high.

8. The vehicle control system according to claim 5, wherein the predetermined condition is a condition that the oncoming vehicle, present on a side in a direction of further advancement than the target obstacle, stops or a condition that the oncoming vehicle, present on a side in a direction of further advancement than the target obstacle, decelerates by at least predetermined degree before a predetermined distance from the target obstacle.

9. The vehicle control system according to claim 1, wherein, in a case in which the oncoming vehicle in a stop state is recognized after causing the vehicle to run based on the second reference line, the driving controller determines whether to cause the vehicle to run based on the second reference line or to cause the vehicle to run such that the distance between the vehicle and the oncoming vehicle in the horizontal direction is further away than the second reference line in accordance with a distance from the vehicle to the target obstacle.

10. The vehicle control system according to claim 9, wherein, in a case in which a distance to the target obstacle is equal to or longer than a set distance, the driving controller is configured to cause the vehicle to run such that the distance between the vehicle and the oncoming vehicle in the horizontal direction is further away than the second reference line.

11. The vehicle control system according to claim 9, wherein, in a case in which a distance to the target obstacle is shorter than a set distance, the driving controller is configured to cause the vehicle to run based on the second reference line.

12. The vehicle control system according to claim 1, wherein the second reference line is defined between the first reference line and a running line of a case in which the vehicle runs without coming into contact with the target obstacle.

13. A vehicle control method using a computer, the vehicle control method comprising:
recognizing a surroundings status of a vehicle;
controlling at least steering of the vehicle on the basis of the recognized surroundings status, wherein the controlling comprises:
causing the vehicle to run based on a first reference line that deviates to a first side of a road in a case in which a target obstacle is not recognized in an advancement direction of the vehicle; and
causing the vehicle to avoid the target obstacle comprising causing the vehicle to run based on a second reference line disposed on a second side of the road from the first reference line in a case in which a target obstacle is recognized in the advancement direction of the vehicle, wherein the first reference line and the second reference line are different reference lines, and wherein the second reference line is closer to a center of the road than the first reference line,
wherein, in a case in which at least one oncoming vehicle that is near the target obstacle and on a second side of the road, wherein the second side is laterally opposite the first side of the road, is recognized after causing the vehicle to run based on the second reference line, causing the vehicle to run such that a first distance between the vehicle and the oncoming vehicle, in a horizontal direction, is further away from the oncoming vehicle as compared to a second distance between the vehicle and the oncoming vehicle in a case in which the vehicle runs based on the second reference line.

14. A non-transitory computer-readable storage medium that stores a computer program to be executed by a computer to perform at least:
recognize a surroundings status of a vehicle;
control at least steering of the vehicle on the basis of the recognized surroundings status;
cause the vehicle to run based on a first reference line that deviates to one side of a road in a case in which a target obstacle is not recognized in an advancement direction of the vehicle; and
cause the vehicle to avoid the target obstacle based on causing the vehicle to run based on a second reference line disposed on another side of the road in a case in which the target obstacle is recognized in the advancement direction of the vehicle, wherein the first reference line and the second reference line are different reference lines, and wherein the second reference line is disposed closer to a center of the road than the first reference line,
wherein, in a case in which at least one oncoming vehicle that is near the target obstacle and on a second side of the road, wherein the second side is laterally opposite the first side of the road, is recognized after causing the vehicle to run based on the second reference line, cause the vehicle to run such that a first distance between the vehicle and the oncoming vehicle, in a horizontal direction, is further away from the oncoming vehicle as compared to a second distance between the vehicle and the oncoming vehicle in a case in which the vehicle runs based on the second reference line.

* * * * *